United States Patent Office 2,851,440
Patented Sept. 9, 1958

2,851,440

DIHYDROXYALKYL ALLYLARYL ETHERS AND POLYMERS THEREFROM

Gaetano F. D'Alelio, Pittsburgh, Pa., assignor to Koppers Company, Inc., a corporation of Delaware No Drawing. Application October 20, 1954
Serial No. 463,615

24 Claims. (Cl. 260—47)

This invention is concerned with certain new dihydroxyalkyl alkenylaryl ethers. It is concerned with these substances in a monomeric as well as polymeric form. Furthermore, the invention is concerned with insoluble or "cured" polymers which can be obtained by treating dihydroxyalkyl alkenylaryl ether polymers to cause crosslinking.

The invention is particularly concerned with dihydroxyalkyl alkenylaryl ethers of the formula

in which Ar is an arylene group and $n$ is an integer having a value no greater than 8.

In particular the invention is concerned with dihydroxyalkyl allyl phenyl ethers. It will be realized that polymers of this invention contain dihydroxyalkyl groups. These polymers are useful in many polymer applications such as for molding, coatings, laminating and adhesives and by, for example, esterification with drying oil fatty acids for paints, and for reaction with polyisocyanates or polyoxiranes and the like.

As used herein the term "polymer" embraces both homopolymers and copolymers. The term "copolymer" as used herein embraces polymeric materials derived from the polymerization of two or more monomeric materials. That is, 2,3,4,5 ... ad infinitum copolymerizable monomeric substances can be copolymerized to produce "a copolymer." As used herein the terms "parts" and "percentages" indicate parts and percentages by weight unless otherwise specified. The invention is illustrated by, but not restricted to, the following preferred embodiments:

EXAMPLE I

*1-(4-allylphenoxy)-2,3-propanediol*

One hundred parts of 1-(4-allylphenoxy)-2,3-epoxypropane, obtained from 4-allyl phenol and epichlorohydrin by the procedure described in Example I of my copending application Serial No. 463,609 filed concurrently herewith, is boiled in dilute aqueous caustic for one hour. The mixture is cooled and acidified with hydrochloric acid. The mixture is extracted with five equal volume portions of ether, the portions combined, and the ether removed by evaporation. The compound is recrystallized from benzene. There is obtained the desired product which is characterized by analyses for carbon and hydrogen and oxygen and by hydrogen absorption, the results of which are in substantial agreement with the theoretical values.

EXAMPLE II

*1-(3-allylphenoxy)-2,3-propanediol*

1-(3-allylphenoxy)-2,3-epoxypropane, obtained from 3-allyl phenol and epichlorohydrin by the process described in my copending application Serial No. 463,609 filed concurrently herewith, is treated according to the procedure of Example I. There is obtained the desired compound which is characterized by carbon and hydrogen analyses and by analytical hydrogenation which give values in substantial agreement with the theoretical values.

EXAMPLE III

*1-(2-allylphenoxy)-3,4-butanediol*

1-(2-allylphenoxy)-3,4-epoxybutane, obtained from 2-allyl phenol and 1-chloro-3,4-epoxybutane by the procedure described in my presently copending application Serial No. 463,609 filed concurrently herewith, is treated according to the procedure of Example I. There is obtained the desired compound which is characterized by carbon and hydrogen analyses and by analytical hydrogenation which give values in substantial agreement with the theoretical values.

It will be realized that the various dihydroxyalkyl allylaryl ethers of this invention can be obtained by the hydrolysis of the corresponding epoxyalkyl allylaryl ethers described in my copending application. Additionally, it is to be noted that the dihydroxy compounds of this invention are produced in minor quantities in the preparation of the corresponding epoxyalkyl allylaryl ethers by the reaction of an allylaryloxy salt with an epihalohydrin as described in my above-mentioned application. These dihydroxy compounds are characterized by analyses for carbon and hydrogen and analytical hydrogenation.

EXAMPLE IV

One hundred parts 1-(4-allylphenoxy)-2,3-propanediol obtained as in Example I are admixed with three-fourths part benzoyl peroxide. The atmosphere is alternately purged with nitrogen and evacuated to approximately 0.5 mm. mercury. The compound is then heated at 80–105° C. for approximately 2 days. There is obtained polymeric 1-(4-allylphenoxy)-2,3-propanediol, which is a linear, soluble polymer.

Similarly, linear, soluble polymers of 1-(3-allylphenoxy)-2,3-propanediol (obtained as in Example II), 1-(2-allylphenoxy)-3,4-butanediol (obtained as in Example III) and of the other dihydroxyalkyl allylaryl ethers of this invention are obtained by following the foregoing procedure. For the benzoyl peroxide utilized therein, there can be substituted a variety of peroxy catalysts such as hydrogen, acetyl, acetyl-benzoyl, phthalyl and lauroyl peroxides, tertiary-butyl hydroperoxides, etc., and other percompounds, for example ammonium persulfate, sodium persulfate, sodium perchlorate and the like.

EXAMPLE V

Ninety parts styrene, 10 parts 1-(4-allylphenoxy)-2,3-propanediol and three-fourths part benzoyl peroxide are admixed in a reaction vessel and the atmosphere swept out and filled with nitrogen. The polymerizable mass is heated at 80–105° C. for approximately 2 days. There is obtained a soluble, linear copolymer.

EXAMPLE VI

Example V is repeated substituting for the allylphenoxy diol there utilized an equal weight of 1-(2-allylphenoxy)-2,3-propanediol (obtained as in Example II). There is obtained a linear, soluble copolymer.

EXAMPLE VII

Example V is repeated substituting for the reactants there used 50 parts 1-(4-allylphenoxy)-2,3-propanediol, 50 parts maleic anhydride and 1 part benzoyl peroxide dissolved in 500 parts xylene. At the end of the heating the xylene is removed by vacuum distillation. There is obtained a linear, soluble copolymer.

EXAMPLE VIII

Example V is repeated substituting for the styrene there used, an equal weight of acrylonitrile. There is obtained a linear, soluble copolymer.

EXAMPLE IX

Example V is repeated substituting for the styrene there utilized, an equal weight of butadiene. There is obtained a linear, soluble copolymer.

EXAMPLE X

Example V is repeated substituting for the styrene there utilized, an equal weight of ethyl methacrylate. There is obtained a linear, soluble copolymer.

Examples V–X inclusive illustrate the preparation of copolymers of the various compounds of this invention and copolymerizable ethylenic monomers.

It is to be realized that any of the various dihydroxyalkyl allylaryl ethers of this invention can be substituted for the particular compound of the invention utilized in the immediately foregoing illustrations of copolymerization to yield copolymers. Furthermore, there can be utilized mixtures of two or more of the compounds of this invention in the preparation of copolymers either of the compounds of this invention alone or in combination with a copolymerizable ethylenically unsaturated monomer, or mixtures of two or more such copolymerizable ethylenically unsaturated monomers.

As noted above in connection with the homopolymerization of the compounds of this invention various "per" compounds can be used as catalysts in preparation of the above-described copolymers.

EXAMPLE XI

One hundred parts of the polymer of Example IV are admixed with 4 parts 2,4-toluenediisocyanate and the mixture heated for one hour at 75° C. There is obtained an insoluble, infusible, cross-linked polymer.

There can be substituted for the polymer of Example IV any of the various polymers of the compounds of this invention such as, for example, the polymers of Examples V through X inclusive. There are obtained insoluble, infusible, cross-linked copolymers. Additionally, there can be substituted for the 2,4-toluene diisocyanate, other diisocyanates such as phenylenediisocyanate, 2,6-toluenediisocyanate, 1,5-naphthalenediisocyanate, 1-chloro-1-phenylene-2,4-diisocyanate, 4,4'-xenylenediisocyanate, methylene bis-(4-phenylisocyanate), hexamethylenediisocyanate, tetramethylenediisocyanate and the like. The amount of these diisocyanates utilized is governed by the degree of cross-linking desired.

EXAMPLE XII

One hundred parts of the polymer of Example V is admixed with 10 parts of the diglycidyl ether of bisphenol and 1 part ethylene diamine, and the mixture heated to approximately 75° C. There is obtained a thermoset resin.

EXAMPLE XIII

Example XII is repated utilizing in place of the diglycidyl ether of bisphenol an equal weight of the resin described at column 7 of my U. S. Patent 2,658,885 granted Nov. 10, 1953. There is obtained a thermoset resin. It will be realized that the various epoxyalkoxy hydrocarbon-substituted-phenol aldehyde resins described in that patent can be utilized in the foregoing procedure. Additionally the epoxyalkoxy chlorine-substituted-phenol aldehyde resins described in my U. S. Patent 2,658,884 granted Nov. 10, 1953 can be utilized in the foregoing procedure.

It is to be noted that in place of ethylene diamine catalyst utilized in Examples XII and XIII there can be substituted equivalent portions of such amine catalysts as tetrahydroquinoline and piperidine to obtain substantially similar results.

EXAMPLE XIV

One hundred parts of the polymer of Example V is heated with 100 parts of linseed fatty acids in a closed stainless steel kettle equipped with an agitator, a means for introducing an inert gas below the surface of the liquid contents and a gas outlet means. The mixture is heated to approximately 175° C. and agitated while nitrogen is passed through the reaction mass to carry off the water produced by the esterification reaction.

There is obtained a modified polymer having greater oil-solubility than the original polymer, said modified polymer being particularly useful in the preparation of paints and varnishes. It will be realized that for the linseed fatty acids utilized above, there can be substituted a variety of drying oil and semi-drying oil fatty acid compositions. Such fatty acids are those derived from linseed, dehydrated castor, tung, perilla, soybean, oiticia, fish, hempseed, poppy seed, sunflower oils, etc. Further, the various linear, soluble polymers and copolymers of the monomers of this invention can be esterified according to the foregoing procedure to yield products of increased oil solubility and of utility in the preparation of paints and varnishes.

In those instances in which the hydroxyalkyl allylaryl ethers are copolymerized with ethylenically unsaturated monomers which do not posses other potentially reactive groups it is desirable that at least one percent of the dihydroxyalkyl allylaryl ethers be included in the polymer molecule for cross-linking purposes such as, for example, by reaction with polyisocyanate or polyoxirane compounds as heretofore described.

It will be realized that the dihydroxy compounds, of this invention, upon esterification, yield products possessing greater oil solubility than do the esterified monohydroxy compounds, as a result of which they possess a wider range of utility in the preparation of paints, varnishes, and the like.

It will be realized that the hydrophilic properties of the monomers and polymers of this invention can be increased by reaction by the introduction of a plurality of hydroxyalkylene groups into the molecule such as, for example, by the reaction of an alkylene oxide such as ethylene or propylene oxide with a hydroxyl group of the monomers or polymers of this invention. In particular, the epoxyalkyl alkenylaryl ethers described and claimed in my copending application filed concurrently herewith, can be reacted with the monomers and polymers of this invention to produce desirable modifications thereof.

While the invention has been described with reference to particular embodiments thereof, it will be understood that in its broadest aspects the invention may be variously embodied within the scope of the invention as set forth herein and in the appended claims.

I claim:

1. A dihydroxyalkyl alkenylaryl ether of the formula

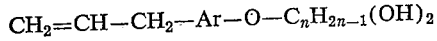

in which Ar is an arylene group, $n$ is an integer having a value of at least 3 and no greater than 8 and in which the hydroxyl groups are substituted on adjacent carbon atoms.

2. 1-(4-allylphenoxy)-2,3-propanediol.
3. 1-(3-allylphenoxy)-2,3-propanediol.
4. 1-(2-allylphenoxy)-3,4-butanediol.
5. A homopolymer of a dihydroxyalkyl allylaryl ether of claim 2.
6. A polymer of a dihydroxyalkyl alkenylaryl ether having a plurality of repeating units of the formula

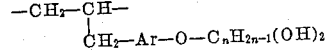

in which Ar is an arylene group, $n$ is an integer having a value of at least 3 and no greater than 8 and in which the hydroxyl groups are substituted on adjacent carbon atoms.

7. A copolymer of a dihydroxyalkyl allylaryl ether of claim 1 and at least one other copolymerizable ethylenically unsaturated monomer.

8. A copolymer of 1-(4-allylphenoxy)-2,3-propanediol and a polymerizable mass comprising at least one other copolymerizable ethylenically unsaturated monomer.

9. A copolymer of claim 7 in which the polymerizable mass comprises styrene.

10. A copolymer of claim 7 in which the polymerizable mass comprises butadiene.

11. A copolymer of claim 7 in which the polymerizable mass comprises acrylonitrile.

12. A copolymer of claim 7 in which the polymerizable mass comprises maleic anhydride.

13. A copolymer of claim 7 in which the polymerizable mass comprises methyl methacrylate.

14. An insoluble polymer of a dihydroxyalkyl allylaryl ether of claim 1 and at least one other polymerizable ethylenic monomer, said polymer containing a plurality of cross-linkages derived from hydroxy groups of said dihydroxyalkyl groups.

15. An insoluble polymer of a polymerizable mass comprising 1-(4-allylphenoxy)-2,3-propanediol and at least one other polymerizable ethylenic monomer, said polymer containing a plurality of cross-linkages derived from hydroxy groups of said dihydroxyalkyl groups.

16. An insoluble polymer of claim 14 in which the polymerizable mass comprises styrene.

17. An insoluble polymer of claim 14 in which the polymerizable mass comprises butadiene.

18. An insoluble polymer of claim 14 in which the polymerizable mass comprises acrylonitrile.

19. An insoluble polymer of claim 14 in which the polymerizable mass comprises maleic anhydride.

20. An insoluble polymer of claim 14 in which the polymerizable mass comprises methyl methacrylate.

21. A copolymer of 1-(3-allylphenoxy)-2,3-propanediol and a polymerizable mass comprising at least one other copolymerizable ethylenically unsaturated monomer.

22. A copolymer of 1-(2-allylphenoxy)-3,4-butanediol and a polymerizable mass comprising at least one other copolymerizable ethylenically unsaturated monomer.

23. An insoluble polymer of a polymerizable mass comprising 1-(3-allylphenoxy)-2,3-propanediol and at least one other polymerizable ethylenic monomer, said polymer containing a plurality of cross-linkages derived from hydroxy groups of said dihydroxyalkyl groups.

24. An insoluble polymer of a polymerizable mass comprising 1 - (2 - allylphenoxy) - 3,4 - butanediol and at least one other polymerizable ethylenic monomer, said polymer containing a plurality of cross-linkages derived from hydroxy groups of said dihydroxyalkyl groups.

References Cited in the file of this patent

UNITED STATES PATENTS 599,123    Endemann _____ Feb. 15, 1898

FOREIGN PATENTS 651,334    Great Britain _____ Mar. 14, 1951